United States Patent
Xu et al.

(10) Patent No.: US 10,075,355 B2
(45) Date of Patent: Sep. 11, 2018

(54) VERIFYING METHOD AND DEVICE FOR CONSISTENCY OF FORWARDING BEHAVIORS OF ROUTER DATA BASED ON ACTION CODES

(71) Applicant: Tsinghua University, Beijing (CN)

(72) Inventors: Ke Xu, Beijing (CN); Yanyu Chen, Beijing (CN); Meng Shen, Beijing (CN); Yong Jiang, Beijing (CN); Dongchao Ma, Beijing (CN)

(73) Assignee: Tsinghua University, Beijing (CN)

( * ) Notice: Subject to any disclaimer, the term of this patent is extended or adjusted under 35 U.S.C. 154(b) by 123 days.

(21) Appl. No.: 15/094,990

(22) Filed: Apr. 8, 2016

(65) Prior Publication Data

US 2016/0301564 A1    Oct. 13, 2016

(30) Foreign Application Priority Data

Apr. 9, 2015   (CN) .......................... 2015 1 0165810

(51) Int. Cl.
  *H04L 12/26*    (2006.01)
  *H04L 12/24*    (2006.01)

(52) U.S. Cl.
  CPC ...... *H04L 43/0817* (2013.01); *H04L 41/0869* (2013.01)

(58) Field of Classification Search
  None
  See application file for complete search history.

(56) References Cited

U.S. PATENT DOCUMENTS

| | | | |
|---|---|---|---|
| 6,615,350 B1* | 9/2003 | Schell | G06F 21/33 380/30 |
| 9,713,014 B2* | 7/2017 | Uchiyama | H04W 16/18 |
| 9,787,551 B2* | 10/2017 | Newton | H04L 41/5041 |
| 2004/0168100 A1* | 8/2004 | Thottan | H04L 41/0213 714/4.1 |
| 2008/0262990 A1* | 10/2008 | Kapoor | G06F 9/505 706/20 |

\* cited by examiner

*Primary Examiner* — Sai Aung
*Assistant Examiner* — Richard Schnell
(74) *Attorney, Agent, or Firm* — Kile Park Reed & Houtteman PLLC (57) ABSTRACT

The present disclosure provides a verifying method and device for consistency of forwarding behaviors of router data based on action codes. The verifying method includes following steps of: determining related functions for a number of functional modules of a router; configuring action codes for the function modules of the router, each functional module sending configured action code to control layer after executing the related function; configuring condition codes for the functional modules of the router; combining parts or all of the functional modules according to a preset combination way; constructing a Trie tree, nodes of the Trie tree storing the action codes of the functional modules; detecting whether there is abnormal forwarding behavior in forwarding process of received data packet according to the Trie tree and the received data packet.

7 Claims, 5 Drawing Sheets

VERIFYING METHOD AND DEVICE FOR CONSISTENCY OF FORWARDING BEHAVIORS OF ROUTER DATA BASED ON ACTION CODES

CROSS-REFERENCE TO RELATED APPLICATION

This application claims priority to and benefits of Chinese Patent Application Serial No. 201510165810.7, filed with the State Intellectual Property Office of P. R. China on Apr. 9, 2015, the entire contents of which are incorporated herein by reference.

FIELD

The present disclosure relates to router technology, and more particularly, to a verifying method for consistency of forwarding behaviors of router data based on action codes and a verifying device therefor.

BACKGROUND

During forwarding behavior of router data, some behaviors are normal and some are abnormal. For example, generally, there is a probability of packet loss in the forwarding process. Some packet loss behaviors are normal, for example, packet loss behavior caused by network congestion is normal, and packet loss behavior caused by the router discarding the data packet intentionally is normal. Some data packets should be forwarded and the router discards them for some unexpected reasons and this packet loss behavior is abnormal.

However, during the forwarding behavior of the router data, if the forwarding behaviors of the router date are inconsistent, this may cause problems, such as, network fail problem or network security problem. Therefore, during the forwarding process of data, how to determine whether the forwarding behavior is normal is important to verify consistence of the forwarding behaviors of the router data.

SUMMARY

Embodiments of a first aspect of the present disclosure provide a verifying method for consistency of forwarding behaviors of router data based on action codes. The verifying method considers software programmability between each functional module of programmable router fully, and detects abnormal behavior of the router by using action sequence and condition sequence of the functional module effectively to enable the network operator to find the abnormal behavior effectively and detect the network status in time.

In our implementation, the verifying method for consistency of forwarding behaviors of router data based on action codes, includes following steps of: S1, determining related functions for a number of functional modules of a router; S2, configuring action codes for the function modules of the router, each functional module sending configured action code to control layer after executing the related function; S3, configuring condition codes for the functional modules of the router; S4, combining parts or all of the functional modules according to a preset combination way; S5, constructing a Trie tree, nodes of the Trie tree storing the action codes of the functional modules; S6, detecting whether there is abnormal forwarding behavior in forwarding process of received data packet according to the Trie tree and the received data packet.

The verifying method for consistency of forwarding behaviors of router data based on action codes, according to the embodiment of the present disclosure, considers software programmability between each functional module of programmable router fully, and detects abnormal behavior of the router by using action sequence and condition sequence of the functional module effectively. The verifying method introduces Trie coding to improve coding efficiency and inquiry efficiency. Therefore, the verifying method can maintain network security while it does not affect performance of the router as much as possible.

Embodiments of a second aspect of the present disclosure provide a verifying device for consistency of forwarding behaviors of router data based on action codes. The verifying device includes: a first determining module, configured to determine related functions for a number of functional modules of a router; a first configuring module, configured to configure action codes for the function modules of the router, each functional module sending configured action code to control layer after executing the related function; a second configuring module, configured to configure condition codes for the functional modules of the router; a combining module, configured to combine parts or all of the functional modules according to a preset combination way; a constructing module, configured to construct a Trie tree, nodes of the Trie tree storing the action codes of the functional modules; a detecting module, configured to detect whether there is abnormal forwarding behavior in forwarding process of received data packet according to the Trie tree and the received data packet.

The verifying device, according to the embodiment of the present disclosure, considers software programmability between each functional module of programmable router fully, and detects abnormal behavior of the router by using action sequence and condition sequence of the functional module effectively. The verifying device introduces Trie coding to improve coding efficiency and inquiry efficiency. Therefore, the verifying device can maintain network security while it does not affect performance of the router as much as possible.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Following are detailed descriptions for a verifying method and device for consistency of forwarding behaviors of router data based on action codes.

Figure 1:
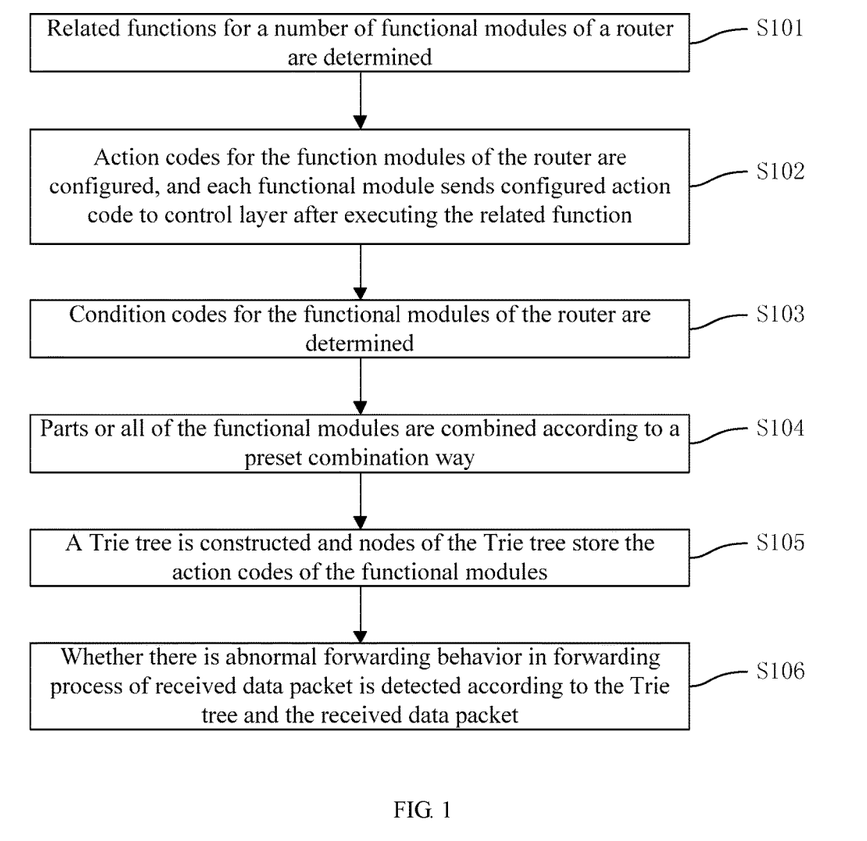
FIG. 1 is a flow chart of a verifying method for consistency of forwarding behaviors of router data based on action codes, according to an embodiment of the present disclosure.

FIG. 1 is a flow chart of a verifying method for consistency of forwarding behaviors of router data based on action codes, according to an embodiment of the present disclosure. As shown in FIG. 1, the verifying method includes the follow steps.

Step S101, related functions for a number of functional modules of a router are determined.

It is to be understood for one having ordinary skill in the art that, the router includes a number of functional modules. Each functional module can achieve a corresponding function. These functions include forwarding function, routing-table updating function, packet-discarding function, self-generating data-packet function, modifying source IP (Internet Protocol) of packet function, modifying destination IP of packet function, modifying data-packet payload function, and verifying function, etc. It is noted that, in the process of determining the related functions for the functional modules of the router, verifying the functional modules is needed. Since the functional module is simpler, the verifying process can be carried out by a third-party manufacturer to prevent fraud.

Step S102, action codes for the function modules of the router are configured, and each functional module sends configured action code to control layer after executing the related function.

Specifically, for the need of coding, each functional module is responsible for a corresponding action. After determining the function for each functional module of the router, different English alphabets can be assigned to different actions. If the alphabet is not enough to assign, symbols can be used to assign. When one functional module receives one data packet, the alphabet or the symbol assigned to the corresponding action is sent to the control layer and is recorded in the cache corresponding to the data packet. After the data packet is processed normally, the cache can automatically free up space.

Step S103, condition codes for the functional modules of the router are determined.

Specifically, some data packets meet the normal forwarding sequences, but these data packets do not meet the normal forwarding conditions. That is to say, the condition for triggering action of the module is not satisfied. Therefore, it needs to configure the forwarding-to-the-next-functional-module condition code for each functional module. It is to be understood that, Huffman coding has advantages of shortening a total length of the code and fast finding a match. Therefore, when configuring the condition codes for the functional modules, the code information can use Huffman coding. That is, length of the high-use-frequency condition code is the shortest, and length of the low-use-frequency condition code is long. For example, the condition code can be coded from 0, and then to 1, 00, 01, 000, etc. from the high use-frequency to the low use-frequency.

It is to be noted that, in the embodiment of the present disclosure, there are flexible call interfaces between the functional modules. When executing the function once, signals are pushed twice. One is to push the action code to the control layer to process, and another is to push a corresponding condition code to the control layer before forwarding the data packet to other functional modules.

Step S104, parts or all of the functional modules are combined according to a preset combination way.

In the embodiment of the present disclosure, the preset combination way is provided by the router manufacturer. Signal pushing interface of each functional module is accessed to the upper control layer. Interface call parameters between the functional modules are action code assigned by the control layer. After executing self-function, the functional module pushes the code signal to the assigned code cache. When the data packet is finished processing, the cache can automatically free up space. In the embodiment of the present disclosure, the preset combination way can be a combination order.

Step S105, a Trie tree is constructed and nodes of the Trie tree store the action codes of the functional modules.

It is to be understood that, since information in the Trie tree can be found fast, the nodes of the Trie tree can be used to store the action codes of the functional modules. Since it needs to add the condition code of the functional module, the edge of the Trie tree can be coded to construct the Trie tree. Specifically, first, the data packet whose behaviors are normal is used to construct Trie tree representing action set and condition set. When the router receives one data packet, the information of action code is pushed to the control layer correspondingly. The control layer caches the information of action code. After processing the data packet, each functional module of the router sends the data packet to other functional modules and pushes the sending condition to the control layer. The control layer saves the sending condition to the cache. This process constructs Trie tree which includes information of trigger condition code of the functional module and information of action code of the functional module. It is noted that, in the embodiment of the present disclosure, the default edge behavior from the root node to the first node in Trie tree is a reception behavior.

Step S106, whether there is abnormal forwarding behavior in forwarding process of received data packet is detected according to the Trie tree and the received data packet.

Specifically, in the embodiment of the present disclosure, first, the data packet corresponding to the behavior of the router can be obtained and the action code and the condition code are obtained correspondingly. After that, the action code and the condition code corresponding to the data packet are compared to the Trie tree which is maintained by the router, and if corresponding code sequence is not found in the Trie tree, that the behavior of the router is an abnormal behavior is determined.

For example, the router includes a forwarding module and a packet-discarding module. When the forwarding module or the packet-discarding module receives one data packet, it indicates that the data packet needs to be forwarded or discarded. Before processing the date packet, first, the information of the action code and the condition code corresponding to the data packet in the cache is obtained, and then, the sequences of the action code and the condition code is compared to self-maintained Trie tree. If the sequences do not meet the code sequences in the Trie tree, it indicates that the forwarding behavior or the packet-discarding behavior is abnormal. For example, when one data packet is forwarded to the packet-discarding module, the packet-discarding module obtains content in the cache and constructs a normal-discarding-packet Trie tree. Node sequence of the Trie tree indicates a series of conditions and actions when discarding the data packet normally. Then, the packet-discarding module finishes the packet-discarding process and removes the corresponding cache. Besides, after discarding the data packet, the packet-discarding module pushes a corresponding processing signal (such as a resending signal, etc.).

Figure 2:
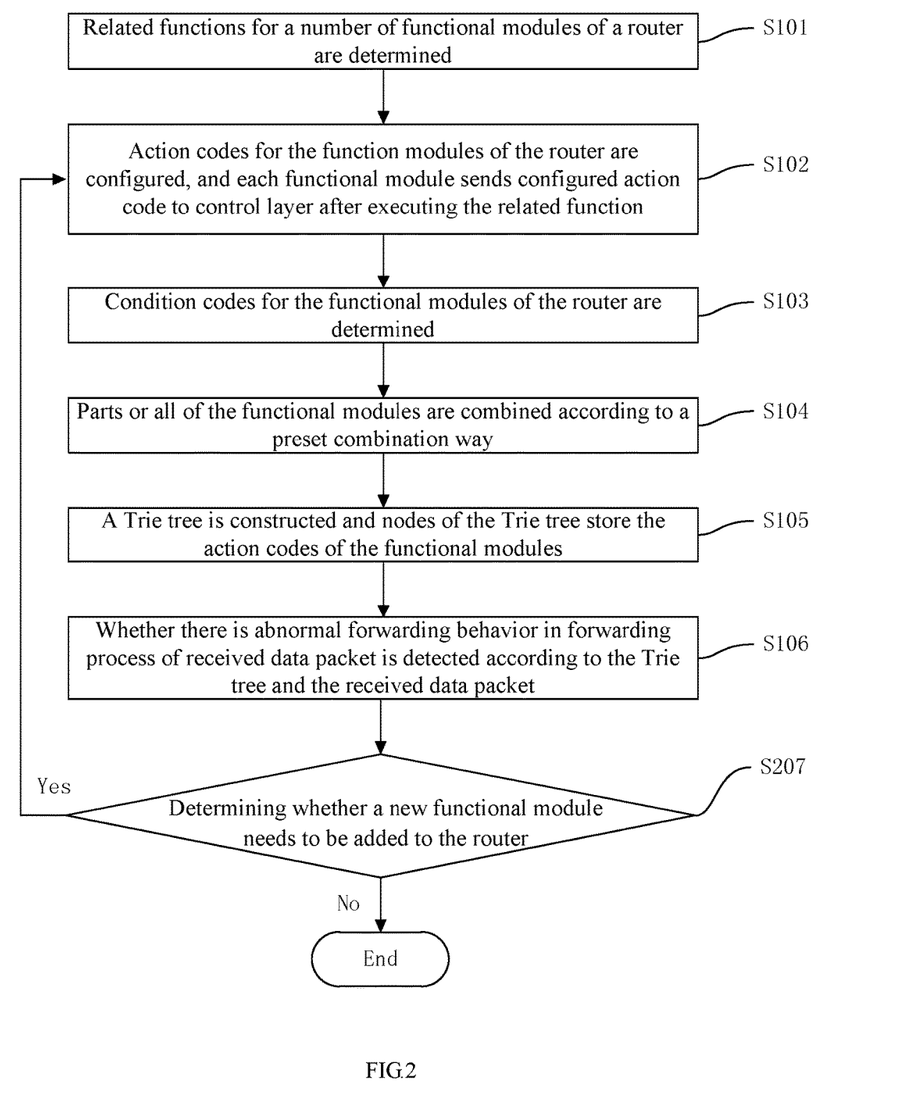
FIG. 2 is a flow chart of a verifying method for consistency of forwarding behaviors of router data based on action codes, according to another embodiment of the present disclosure.

Further, in one embodiment of the present disclosure, as shown in FIG. 2, the verifying method further includes: determining whether a new functional module needs to be added to the router (step S207); and if yes, executing the steps S102 to S106. Specifically, for a new functional module, it is added in the router from the step S102 after verification pass of the third-party manufacturer. It is to be understood that, in the embodiment of the present disclosure, if the newly-added functional module belongs to hardware update of the router, it needs to disable the router shortly. But if the newly-added functional module is achieved by software, the new functional module can be added to the router in real time when the router operates normally. Therefore, since addition of the new functional module is supported, this can improve availability and extensibility of the consistency verification.

The main principle of the verifying method follows. First, related function for each functional module of the router is determined. Then, an extendable Trie tree is constructed by using data packet of normal behavior. Node of the Trie tree represents action and edge of the Trie tree represents trigger condition of the action represented by the node. Node sequence from the root node to the leaf node represents a series of actions in the data forwarding behavior. Edge sequence from the root node to the leaf node represents a series of trigger conditions in the data forwarding behavior. The node sequence and the edge sequence corresponding to the node sequence constitute a complete forwarding behavior. For all data packets received by the functional module, their behaviors are detected to determine whether their behaviors are normal behaviors according to the Trie tree. If there is an abnormal behavior, alert message is pushed to control layer immediately.

The verifying method for consistency of forwarding behaviors of router data based on action codes, according to the embodiment of the present disclosure, considers software programmability between each functional module of programmable router fully, and detects abnormal behavior of the router by using action sequence and condition sequence of the functional module effectively. The verifying method introduces Trie coding and Huffman coding to improve coding efficiency and inquiry efficiency. Therefore, the verifying method can maintain network security while it does not affect performance of the router as much as possible.

Following are specific examples to show usage of the verifying method for consistency of forwarding behaviors of router data based on action codes. After the third-party verifies uniqueness and correctness of functions of the functional modules, action coding and condition coding are performed to the router. When the router including the legal functional modules operates and one functional module is executed, the functional module sends its action code and condition code to the control layer. The codes generated by each functional module are combined to form a long code, which is called action-condition code of the data packet, according to an execution order. Since the router can simultaneously receive data from multiple ports and generate multiple action-condition codes. At this time, it needs to assign cache space for storing the action-condition codes.

It is assumed that number of commonly-used functional module of the router is 7. The function of the functional module is verified by the third-party manufacturer. Table 1 shows information of action codes of each functional module. Table 2 shows information of condition codes of each functional module when forwarding.

TABLE 1 information of action codes of each functional module

| Functional module | Action code |
|---|---|
| Receiving data packet | A |
| Inquiring routing table | B |
| Packet discarding | C |
| Modifying MAC information | D |
| Forwarding to exit port | E |
| Modifying data-packet payload | F |
| Verification pass | G |

TABLE 2 information of condition codes of each functional module when forwarding

| Condition | Usage frequency | Condition code |
|---|---|---|
| Default | 0.3 | 0 |
| Reception | 0.15 | 1 |
| Inquiry | 0.15 | 00 |
| Modification of MAC | 0.12 | 01 |
| Discarding | 0.005 | 010 |
| Buffer queue being full | 0.01 | 001 |
| Forwarding | 0.11 | 10 |
| Modification of data packet | 0.045 | 000 |
| Verification | 0.11 | 11 |

Figure 3:
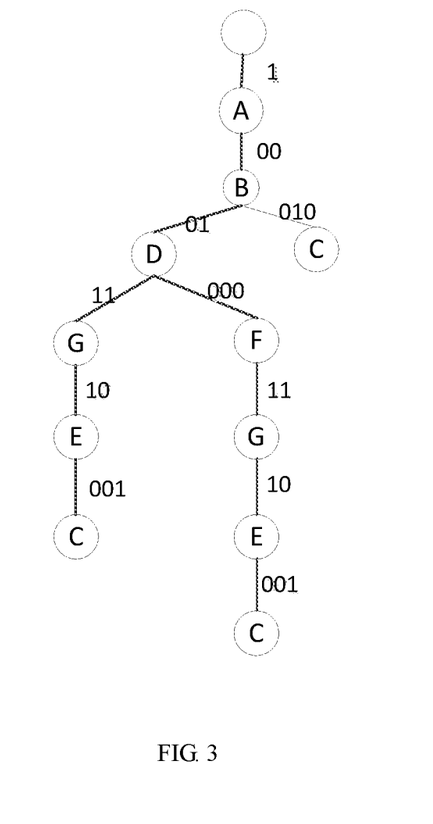
FIG. 3 shows a Trie tree of normal packet-discarding behavior, according to one embodiment of the present disclosure.

Since it needs to detect abnormal packet-discarding behavior, it only needs to construct a Trie tree of normal packet-discarding behavior. As shown in FIG. 3, a code sequence from the root node to the leaf node includes information of the action codes and the condition codes. Each code sequence represents a normal packet-discarding behavior. When receiving one data packet, the packet-discarding module of the router compares the code sequence obtained in the cache to the Trie tree. If the code sequence of the data packet is not included in the Trie tree, then it indicates that the packet loss is an abnormal packet loss incident, and alert message is pushed to the control layer.

For implementation of the above embodiment, a verifying device for consistency of forwarding behaviors of router data based on action codes is provided in the embodiment of the present disclosure.

Figure 4:
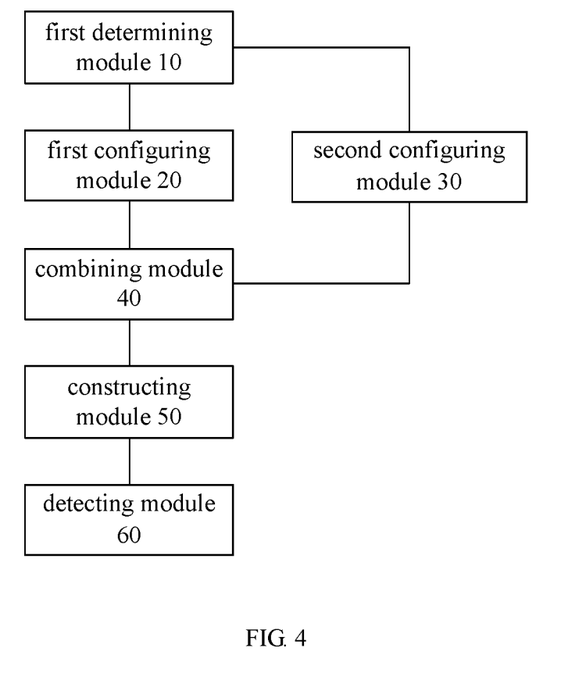
FIG. 4 is a block diagram of a verifying device for consistency of forwarding behaviors of router data based on action codes, according to an embodiment of the present disclosure.

FIG. 4 is a block diagram of a verifying device for consistency of forwarding behaviors of router data based on action codes, according to an embodiment of the present disclosure. As shown in FIG. 4, the verifying device includes a first determining module 10, a first configuring module 20, a second configuring module 30, a combining module 40, a constructing module 50 and a detecting module 60.

Specifically, the first determining module 10 is configured to determine related functions for a number of functional modules of a router. It is to be understood for one having ordinary skill in the art that, the router includes a number of functional modules. Each functional module can achieve a corresponding function. These functions include forwarding function, routing-table updating function, packet discarding function, self-generating data-packet function, modifying source IP (Internet Protocol) of packet function, modifying destination IP of packet function, modifying data-packet payload function, and verifying function, etc. It is noted that, in the process of determining the related functions for the functional modules of the router, verifying the functional modules is needed. Since the functional module is simpler, the verifying process can be carried out by a third-party manufacturer to prevent fraud.

The first configuring module 20 is configured to configure action codes for the function modules of the router. Each functional module sends configured action code to control layer after executing the related function. Specifically, for the need of coding, each functional module is responsible for a corresponding action. After the first determining module 10 determines the function for each functional module of the router, the first configuring module 20 assigns different English alphabets to different actions. If the alphabet is not enough to assign, symbols can be used to assign. When one functional module receives one data packet, the alphabet or the symbol assigned to the corresponding action is sent to the control layer and is recorded in the cache corresponding to the data packet. After the data packet is processed normally, the cache can automatically free up space.

The second configuring module 30 is configured to configure condition codes for the functional modules of the router. More specifically, some data packets meet the normal forwarding sequences, but these data packets do not meet the normal forwarding conditions. That is to say, the condition for triggering action of the module is not satisfied. Therefore, the second configuring module 30 needs to configure the forwarding-to-the-next-functional-module condition code for each functional module. It is to be understood that, Huffman coding has advantages of shortening a total length of the code and fast finding a match. Therefore, when the second configuring module 30 configures the condition codes for the functional modules, the code information can use Huffman coding. That is, length of the high-use-frequency condition code is the shortest, and length of the low-use-frequency condition code is long. For example, the condition code can be coded from 0, and then to 1, 00, 01, 000, etc. from the high use-frequency to the low use-frequency.

It is to be noted that, in the embodiment of the present disclosure, there are flexible call interfaces between the functional modules. When executing the function once, signals are pushed twice. One is to push the action code to the control layer to process, and another is to push a corresponding condition code to the control layer before forwarding the data packet to other functional modules.

The combining module 40 is configured to combine parts or all of the functional modules according to a preset combination way. In the embodiment of the present disclosure, the preset combination way is provided by the router manufacturer. Signal pushing interface of each functional module is accessed to the upper control layer. Interface call parameters between the functional modules are action code cache assigned by the control layer. After executing self-function, the functional module pushes the code signal to the assigned code cache. When the data packet is finished processing, the cache can automatically free up space.

The constructing module 50 is configured to construct a Trie tree. Nodes of the Trie tree store the action codes of the functional modules. It is to be understood that, since information in the Trie tree can be found fast, the nodes of the Trie tree can be used to store the action codes of the functional modules. Since it needs to add the condition code of the functional module, the edge of the Trie tree can be coded to construct the Trie tree. Specifically, the constructing module 50 uses the data packet whose behaviors are normal to construct Trie tree representing action set and condition set. When the router receives one data packet, the information of action code is pushed to the control layer correspondingly. The control layer caches the information of action code. After processing the data packet, each functional module of the router sends the data packet to other functional modules and pushes the sending condition to the control layer. The control layer saves the sending condition to the cache. This process constructs Trie tree which includes information of trigger condition code of the functional module and information of action code of the functional module. It is noted that, in the embodiment of the present disclosure, the default edge behavior from the root node to the first node in Trie tree is a reception behavior.

The detecting module 60 is configured to detect whether there is abnormal forwarding behavior in forwarding process of received data packet according to the Trie tree and the received data packet. Specifically, in the embodiment of the present disclosure, first, the detecting module 60 obtains the data packet corresponding to the behavior of the router and obtains the action code and the condition code correspondingly. After that, the detecting module 60 compares the action code and the condition code corresponding to the data packet to the Trie tree which is maintained by the router, and if corresponding code sequence is not found in the Trie tree, the detecting module 60 determines that the behavior of the router is an abnormal behavior.

For example, when the forwarding module or the packet-discarding module receives one data packet, it indicates that the data packet needs to be forwarded or discarded. Before processing the date packet, first, the detecting module 60 obtains the information of the action code and the condition code corresponding to the data packet in the cache, and then, compares the sequences of the action code and the condition code to self-maintained Trie tree. If the sequences do not meet the code sequences in the Trie tree, it indicates that the forwarding behavior or the packet-discarding behavior is abnormal. For example, when one data packet is forwarded to the packet-discarding module, the packet-discarding module obtains content in the cache and constructs a normal-discarding-packet Trie tree. Node sequence of the Trie tree indicates a series of conditions and actions when discarding the data packet normally. Then, the packet-discarding module finishes the packet-discarding process and removes the corresponding cache. Besides, after discarding the data packet, the packet-discarding module pushes a corresponding processing signal (such as a resending signal, etc.).

Figure 5:
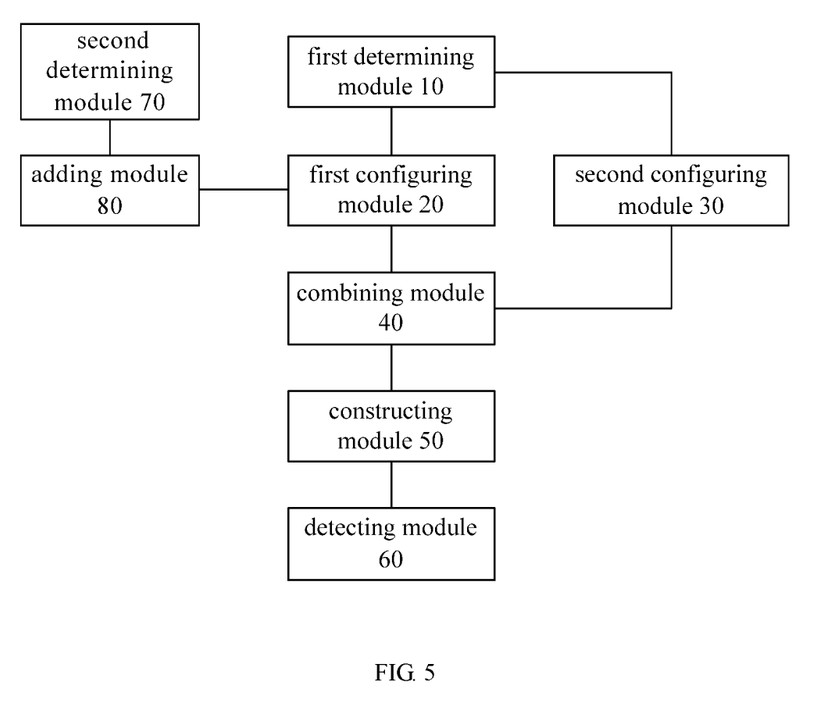
FIG. 5 is a block diagram of a verifying device for consistency of forwarding behaviors of router data based on action codes, according to another embodiment of the present disclosure.

Further, in one embodiment of the present disclosure, as shown in FIG. 5, the verifying device further includes: a second determining module 70 and an adding module 80. Specifically, the second determining module 70 is configured to determine whether a new functional module needs to be added to the router. The adding module 80 is configured to add the new functional module to the router if the new functional module needs to be added to the router.

More specifically, when a new functional module needs to be added in the router, it can be added in the router after verification pass of the third-party manufacturer. The first configuring module 20, the second configuring module 30, the combining module 40, the constructing module 50 and the detecting module 60 process the new functional module successively to detect whether the forwarding behavior of the new functional module is normal. It is to be understood that, in the embodiment of the present disclosure, if the newly-added functional module belongs to hardware update of the router, it needs to disable the router shortly. But if the newly-added functional module is achieved by software, the new functional module can be added to the router in real time when the router operates normally. Therefore, since addition of the new functional module is supported, this can improve availability and extensibility of the consistency verification.

The verifying device for consistency of forwarding behaviors of router data based on action codes, according to the embodiment of the present disclosure, considers software programmability between each functional module of programmable router fully, and detects abnormal behavior of the router by using action sequence and condition sequence of the functional module effectively. The verifying device introduces Trie coding and Huffman coding to improve coding efficiency and inquiry efficiency. Therefore, the verifying device can maintain network security while it does not affect performance of the router as much as possible.

In the following, a non-transitory computer-readable storage medium according to embodiments of the present disclosure will be described in detail.

In some embodiments, the non-transitory computer-readable storage medium having stored therein instructions that, when executed by a processor of a device, causes the device to perform the verifying method for consistency of forwarding behaviors of router data based on action codes.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in an almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the number of procedures or methods may be implemented by the software or hardware stored in the computer memory and executed by the proper code execution system. For example, if the procedures or methods are to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A verifying method for verifying consistency of forwarding behaviors of router data based on action codes, comprising following steps of:

S1, determining related functions for a plurality of functional modules of a router;
S2, configuring action codes for the plurality of functional modules of the router, each functional module sending a configured action code to a control layer after executing the related function;
S3, configuring condition codes for the plurality of functional modules of the router;
S4, combining one or more of the plurality of the functional modules according to a preset combination way;
S5, constructing a Trie tree, nodes of the Trie tree storing the action codes of the functional modules; and
S6, detecting whether there is an abnormal forwarding behavior in a forwarding process of received data packet according to the Trie tree and the received data packet;
wherein the step S6 comprises:
obtaining the data packet corresponding to a behavior of the router and obtaining the action code and the condition code corresponding to the data packet; and
comparing the action code and the condition code corresponding to the data packet to the Trie tree which is maintained by the router, and if corresponding code sequence is not found in the Trie tree, determining that the behavior of the router is the abnormal forwarding behavior.

2. The method of claim 1, further comprising:
S7, if a new functional module needs to be added to the router, executing the steps S2 to S6.

3. The method of claim 1, wherein the preset combination way is provided by a router manufacturer.

4. A verifying device for verifying consistency of forwarding behaviors of router data based on action codes, comprising:
a processor;
a memory, having instructions executable by the processor stored;
wherein the processor is configured to:
determine related functions for a plurality of functional modules of a router;
configure action codes for the plurality of functional modules of the router, each functional module sending a configured action code to a control layer after executing the related function;
configure condition codes for the plurality of functional modules of the router;
combine one or more of the plurality of the functional modules according to a preset combination way;
construct a Trie tree, nodes of the Trie tree storing the action codes of the functional modules; and
detect whether there is an abnormal forwarding behavior in a forwarding process of received data packet according to the Trie tree and the received data packet;
wherein the processor is further configured to:
obtain the data packet corresponding to a behavior of the router and obtain the action code and the condition code corresponding to the data packet; and
compare the action code and the condition code corresponding to the data packet to the Trie tree which is maintained by the router, and if corresponding code sequence is not found in the Trie tree, determine that the behavior of the router is the abnormal forwarding behavior.

5. The device of claim 4, wherein the processor is further configured to:
determine whether a new functional module needs to be added to the router; and
add the new functional module to the router if the new functional module needs to be added to the router.

6. The device of claim 4, wherein the preset combination way is provided by a router manufacturer.

7. A non-transitory computer-readable storage medium having stored therein instructions that, when executed by a processor of a device, causes the device to perform a verifying method for verifying consistency of forwarding behaviors of router data based on action codes, wherein the verifying method comprises following steps of: S1, determining related functions for a plurality of functional modules of a router; S2, configuring action codes for the plurality of functional modules of the router, each functional module sending a configured action code to a control layer after executing the related function; S3, configuring condition codes for the plurality of functional modules of the router; S4, combining one or more of the plurality of the functional modules according to a preset combination way; S5, constructing a Trie tree, nodes of the Trie tree storing the action codes of the functional modules; and S6, detecting whether there is an abnormal forwarding behavior in a forwarding process of received data packet according to the Trie tree and the received data packet; wherein the step S6 comprises: obtaining the data packet corresponding to a behavior of the router and obtaining the action code and the condition code corresponding to the data packet; and comparing the action code and the condition code corresponding to the data packet to the Trie tree which is maintained by the router, and if corresponding code sequence is not found in the Trie tree, determining that the behavior of the router is the abnormal forwarding behavior.

* * * * *